(No Model.)
P. E. PAULLIN.
AGRICULTURAL IMPLEMENT.
No. 267,247. Patented Nov. 7, 1882.
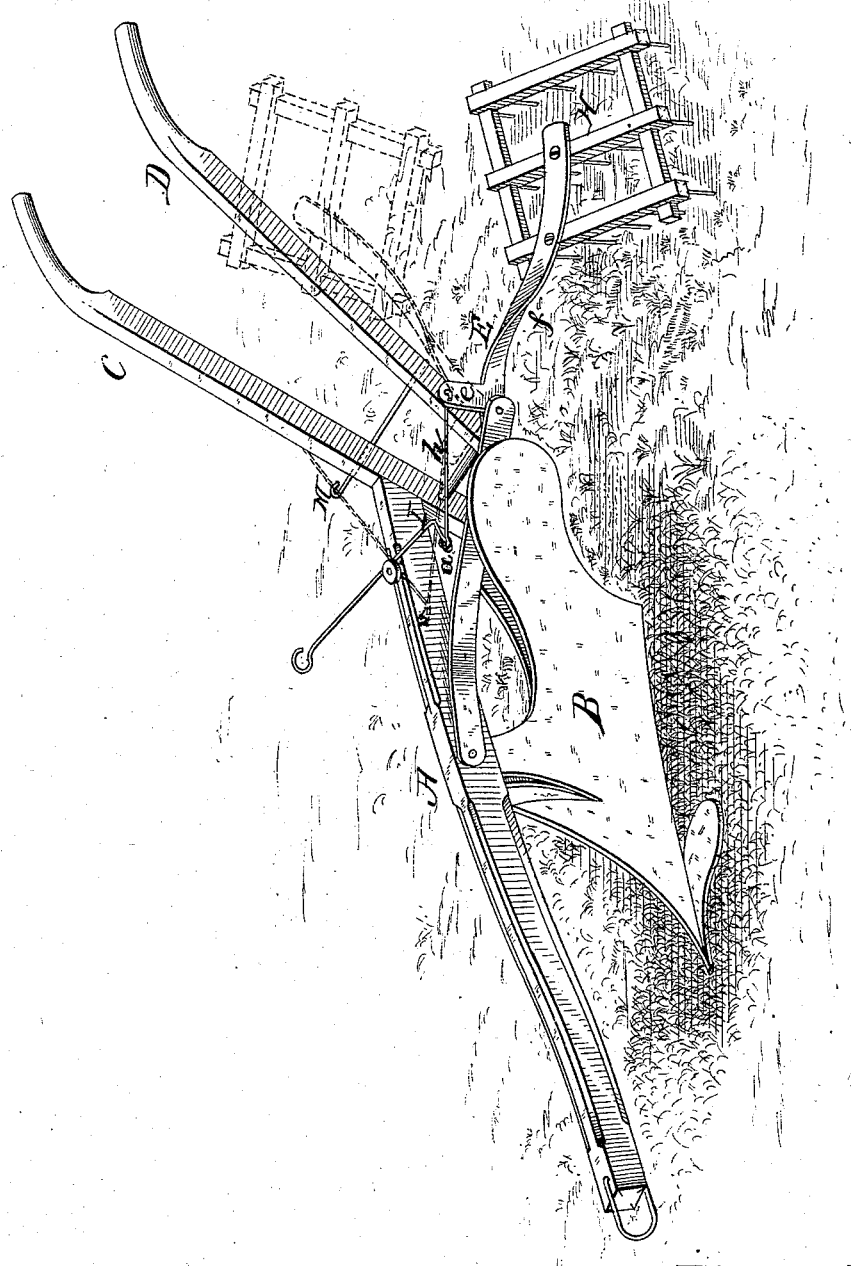
Witnesses:
Walter Fowler,
Chas. C. Gill
Inventor
Peter E. Paullin
By his Attys
Cox & Cox.

UNITED STATES PATENT OFFICE.

PETER E. PAULLIN, OF NEWVILLE, OHIO.

AGRICULTURAL IMPLEMENT.

SPECIFICATION forming part of Letters Patent No. 267,247, dated November 7, 1882.

Application filed October 13, 1881. (No model.)

*To all whom it may concern:*

Be it known that I, PETER E. PAULLIN, of Newville, in the county of Richland and State of Ohio, have invented a new and useful Improvement in Agricultural Implements, of which the following is a specification, reference being had to the accompanying drawing.

The invention relates to an improvement in agricultural implements; and it consists in the devices hereinafter described, and particularly pointed out in the claim.

The operation and details of construction will be understood from the description hereinafter presented, reference being had to the accompanying drawing, which represents in perspective a device embodying the elements of the invention, the dotted lines showing the elevated position of the harrow.

A indicates the plow-beam; B, the plowshare, and C D the handles of the plow. Upon the side of the handle D, and on about a level with the plow-beam, is pivoted the bar or bellcrank lever E, consisting of a short arm, *e*, and an arm or lever, *f*, to which is firmly secured the harrow H, which may be of any suitable construction adapted to the purposes for which it is to be employed. In the end of the short arm *e* is secured one end of the connecting-rod *h*, the other end of which is attached to bent end *a* of the bell-crank lever I, which is pivoted, in the present instance, upon the upper surface of the plow-beam, and has its free arm extending toward the rear and at the right of the handle C, in proper relation to the catch M to be engaged by it at the proper time.

When it is desired to use the plow simply for furrowing the land the free end of the bell-crank lever I is pressed close against the handle C and locked by the catch M. This movement of the lever has the effect of drawing the connecting-rod *h* and the bar E inward, thereby elevating the harrow clear of the ground. When it is desired to lower the harrow the bell-crank lever I is simply disengaged from the catch M, when it will descend of its own weight to the ground.

In operation, I elevate the harrow and then plow the first furrow, after which I lower the harrow and plow the second furrow, during which the harrow acts upon the first furrow plowed and prepares that part of the soil for the seed. In plowing the third furrow the harrow passes over both the first and second furrows, and in plowing the fourth furrow the harrow passes over the second and third furrows. Thus it will be seen that when the field has been gone over once the furrows will not only be made, but the harrow will act upon each furrow twice, thoroughly preparing it for the action of the sun and the reception of the seed.

It will be found desirable to construct the harrow of just about sufficient size to cover two furrows, in order that when in use it will not overbalance the plowshare.

I hereby specifically disclaim the devices shown and described in Letters Patent No. 102,959, granted B. F. Neeley, May 10, 1870; No. 209,046, granted Himrod, October 15, 1878; No. 109, granted D. Swartz, February 28, 1854, and No. 95,925, granted Moore and Wendall, October 19, 1869.

What I claim as my invention, and desire to secure by Letters Patent, is—

The combined plow and harrow herein described, the harrow being secured to the plow and capable of adjustment with relation thereto and with the soil by the bell-crank lever E, pivoted to one side of the plow, the link *h*, connected to the short arm of the lever E, and with the lever I at the front end of its bent portion *a*, the lever I being pivoted on the plow-beam, and having its outer end in proper relation to be grasped by the attendant and drawn to the catch M, substantially as set forth.

In testimony that I claim the foregoing improvement in agricultural implements as above described I have hereunto set my hand this 12th day of August, 1881.

PETER E. PAULLIN.

Witnesses:
A. A. WILSON,
JNO. T. GLESSNER, Jr.